UNITED STATES PATENT OFFICE 2,617,861

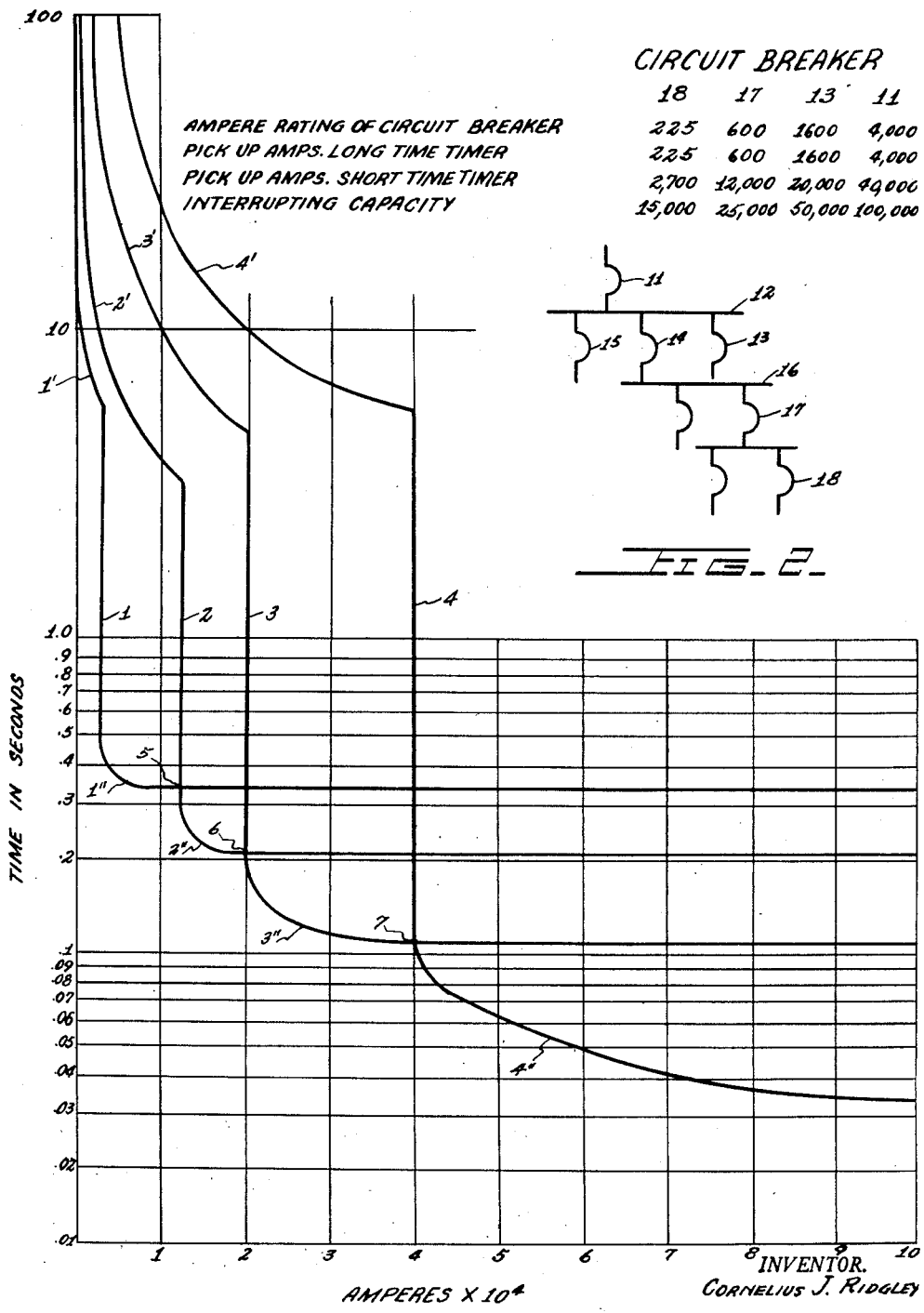

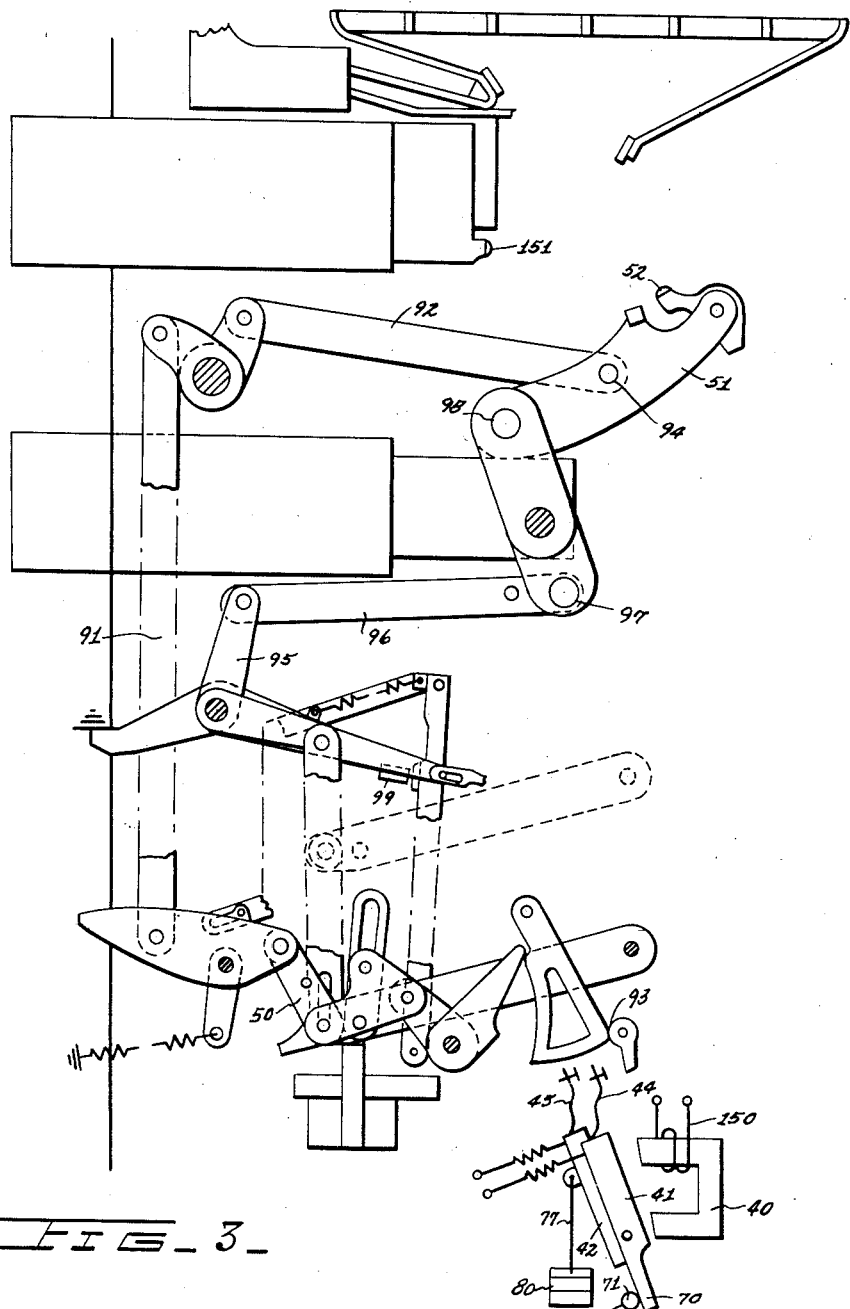

REVERSE CASCADING

Cornelius J. Ridgley, Philadelphia, Pa., assignor to I-T-E Circuit Breaker Company, Philadelphia, Pa., a corporation of Pennsylvania Application March 29, 1950, Serial No. 152,673

5 Claims. (Cl. 175—294)

My invention relates to novel electrical systems and more particularly relates to circuit breakers included in such systems in which the circuit breakers are prevented from opening on fault currents in excess of their interrupting rating.

In electrical distribution systems, circuit breakers protecting the source of electrical power are connected in electrical proximity to this source. Correspondingly there are circuit breakers connected to the distribution circuit, the main feeder circuit, branch feeder circuits and finally, circuit breakers for protecting individual loads.

In many such systems, there has recently been developed selective tripping systems, each of the circuit breakers in the system has an individual time current characteristic responsive to fault currents. The circuit breakers electrically nearest the load have shorter trip time characteristics for the same current than circuit breakers further removed from the load; i. e., the circuit breakers electrically closer to the source each having successively longer time current characteristics. Accordingly, for the same fault current value, it takes longer for the circuit breaker nearest the source to trip than the breaker more remote therefrom.

By this arrangement, as will now be apparent, the circuit breaker nearest the fault will open first in response to the fault, thus opening the minimum amount of system while still isolating the fault. Power interruption is thus reduced to a minimum. Such a system is described in Patent 2,439,165.

In such a system, all of the circuit breakers in practice have the same interrupting capacity so that each can take care of any fault current that may occur. In practice, it has been found that the economics of system requirements, i. e., cost and space requirements, of circuit breakers, makes it impractical to have all of the circuit breakers of sufficient interrupting capacity to interrupt the maximum calculated fault current that may occur in the system.

This is particularly true of enclosed switchgear units where the fault current beyond the branch circuit breakers may still not be substantially less than that which might occur at the main circuit breaker.

For such systems, it has been found that it is economical to use circuit breakers "cascaded," i. e., a series arrangement of circuit breakers in which the successive circuit breakers have successively graded interrupting capacities. In such a system the circuit breakers nearest the load have the lowest interrupting capacity.

The circuit breakers in a convention cascaded system are provided with instantaneously operating trip elements set to operate in response to predetermined fault currents; this instantaneous trip value being related to the interrupting rating of the circuit breaker next in line toward the load end of the system and which has an interrupt rating less than that required. Thus, for example, a breaker at the load end may have an interrupting rating of 15,000 amperes; that is to say, it can interrupt a fault current of 15,000 amperes but no more. In that case the next breaker electrically positioned toward the source would have an instantaneous operation of its trip magnet at about 12,500 amperes so as to be sure to trip in time to interrupt the fault which the first circuit breaker does not have the capacity to clear. This same relative arrangement obtains for each of successive electrically adjacent circuit breakers.

Although the arrangement described above makes certain that a breaker having the necessary interrupting rating opens in time to interrupt the fault current, it was found in practice to place a severe burden on the smaller breaker in series with it which opened simultaneously with the larger circuit breaker but did not have the necessary interrupting capacity. The arc that formed across the contacts of this circuit breaker frequently damaged the contacts before it was extinguished by the operation of the larger circuit breaker.

I have discovered that inasmuch as only the circuit breaker which has the necessary interrupting capacity will in the end actually interrupt the fault, it is unnecessary to place any extra burden on the smaller circuit breaker.

In accordance with the present invention, I prevent the circuit breaker which lacks the necessary interrupting capacity for any particular fault from opening its contacts at all in response to such a fault current. I achieve this result by providing individual time delay characteristics for the tripping mechanism of each of the circuit breakers having the characteristic that the circuit breaker which is nearest the load has a shortest time of operation in the long time overload range, and in the short time short circuit range up to about its interrupting capacity. However, at or just less than the interrupting rating of the circuit breaker, the time of operation of the trip device becomes longer than for the next adjacent larger circuit breaker. I call this reverse cascade.

Accordingly an object of my invention is to provide a novel circuit breaker system in which a novel arrangement of circuit breakers connected in cascade is provided with mechanisms for effecting faster circuit opening operation of the circuit breaker nearest the fault than for the next larger electrically adjacent circuit breaker for all values up to a predetermined percentage of the interrupting rating of the circuit breaker and slower circuit opening operation than the same next larger circuit breaker for current values at and above the predetermined percentage of the interrupting rating.

A further object of my invention is to provide a novel circuit breaker which has a novel time characteristic curve and novel blow-open and blow-closed constructions of the movable contact operating mechanisms.

Other objects will become apparent from the detailed description which follows in connection with the drawings in which:

Figure 1 shows a series of time current characteristic curves of a plurality of circuit breakers arranged in cascade in accordance with my invention;

Figure 2 is a schematic circuit diagram of circuit breakers arranged in cascade; and Figure 3 is a schematic drawing of a representative over current device shown in conjunction with a "blow-open blow-closed" circuit breaker mechanism.

Referring to Figure 2, I have schematically shown here a circuit breaker 11 adjacent to a generator or other source of electrical power. Circuit breaker 11 is connected to a tie bus 12 to which individual branches, having circuit breakers 13, 14 and 15 are connected. The circuit breaker 13 in turn is connected to a tie bus 16 from which individual circuits protected by individual circuit breakers, such as 17, extend as shown. Circuit breaker 17 in turn is connected to bus 18 to which individual load circuits protected by individual circuit breakers 18 are connected.

The circuit breaker 18 in my particular illustration is shown as having a continuous current carrying capacity of 225 amperes; an interrupting rating of 15,000 amperes; and a short time pick-up of 2700 amperes. This latter means that for a continuous flow of 225 amperes the circuit breaker trip mechanism will not respond. If, however, the continuous current rises above 225 amperes, the trip mechanism will respond in varying times depending upon the overload current as shown by the curves of Fig. 1.

In Figure 1, curve 1 represents the time-current characteristic curve for circuit breaker 18 which is closest to the load. Curve 2 is the time current characteristic curve for circuit breaker 17 next to the circuit breaker 1 and electrically closer than circuit breaker 18 to the source. Curve 3 is the time current curve of the next adjacent circuit breaker 13 toward the generator, and the curve 4 is the time current curve of the circuit breaker 11 at the generator or source.

It will be noted that circuit breaker 18 has an overload long time portion as shown in the curve 1' of curve 1 which is a shorter time characteristic for any overload current value than circuit breaker 17 as shown by the corresponding portion 2' of curve 2. Moreover, the short time delay of circuit breaker 18 as shown by the portion 1" of curve 1 is a shorter time than the corresponding time of circuit breaker 17 as shown by the portion of the curve 2 for any fault current value up to point 5. At this current value which is a predetermined percentage (i. e. 80%) of the interrupting rating of current breaker 18, the time current characteristic of the circuit breaker 18 crosses the time current curves of circuit breaker 17. Therefor for current values up to that corresponding to point 5, circuit breaker 18 opens faster than circuit breaker 17. Thus, for example, at 10,000 amperes, circuit breaker 17 takes approximately 5 seconds, whereas circuit breaker 18 takes only .35 second to open.

Correspondingly breaker 17 has a shorter time-current characteristic over the portion 2' of its time-current curve than does circuit breaker 13 as shown by the corresponding portion 3' of its curve 3. In the short circuit range 2" the time current curve for circuit breaker 17 is still shorter than for circuit breaker 13 up to the point 6 on the curve 2.

For any current in excess of the value shown at point 6, the circuit breaker 17 takes a longer time to trip than does circuit breaker 13. Finally the portion 3' of circuit breaker 13 shows a shorter time current characteristic than the portion 4' for circuit breaker 11 and the short time portion 3" of the circuit breaker 13 shows a shorter time than does the corresponding portion of the curve for circuit breaker 11 up to the point 7. At this point, the time characteristic of the circuit breaker 13 becomes longer than that for circuit breaker 11.

The net result of this is that for any fault up to or just below the interrupting rating of circuit breaker 18, its time delay mechanism acts faster than any subsequent circuit breaker and will open to interrupt the fault. At some predetermined current value just below the interrupting rating of circuit breaker 18, the short-time tripping delay characteristic of the circuit breaker 18 becomes longer than the next adjacent circuit breaker 17 and accordingly for any fault current in excess of the interrupting rating of circuit breaker 18, the circuit breaker 17 will take over and interrupt the fault. A similar condition exists for faults up to or just below the interrupting rating of circuit breaker 17 at which point circuit breaker 13 begins to act faster and will take care of the fault.

Circuit breaker 13 in turn will interrupt any fault up to or just below its interrupting rating at which point circuit breaker 11 will operate to interrupt the fault by virtue of its short-time characteristic.

Inasmuch as the first circuit breaker to open will substantially de-energize the trip coils of the other circuit breakers in the system, any circuit breaker which has not interrupted by the time the fault has been cleared, and the timer of which has not yet released its tripping mechanism will stay closed. In this manner damage to the smaller rated circuit breakers which could not have adequately interrupted the fault is avoided.

Summarizing the above, it will be observed now that by a proper coordination of the short time characteristics, each of the circuit breakers are delayed in opening on a fault current in excess of its maximum interrupting rating until a circuit breaker with a higher interrupting rating has the opportunity to clear the fault. Thus a circuit breaker is spared having the duty of opening a current above its interrupting rating with resulting damage to the circuit breaker.

In substance, in the example given, four circuit breakers of varying interrupting capacities are arranged in cascade in such a manner that a short circuit current beyond circuit breaker 18 causes a fault current to flow through the series arrangement of circuit breakers 18, 17, 13 and 11.

It will be noted that the long time delay element of each circuit breaker is set to operate at 100% of its normal continuous current rating and that the short time delay element is set to operate at approximately 80% of the interrupting rating of the next smaller circuit breaker.

These settings are dictated by the load requirements and the coordination requirements of the system. The true cascade principle of the setting of the short time armature to 80% of the interrupting rating of the next lower breaker is thus utilized.

It will also be noted that the basic concept of the conventional cascading, namely of using instantaneous trip devices, is also violated.

Circuit breaker 18 has the lowest interrupting capacity in the system. Its long time delay element and short time delay elements will permit unhindered tripping operation according to its characteristics up to 12,000 amperes in the specific case shown in Figure 1. Assuming a fault beyond circuit breaker 18, if the magnitude of the fault current be greater than 12,000 amperes, the short time element of circuit breaker 17 will serve to operate in less time than that of circuit breaker 18 and consequently will tend to "take over" the duty of interrupting the fault current provided that the current does not cause the short time element of circuit breaker 13 to operate. For fault currents in excess of the minimum operating setting of the short time element of circuit breaker 13 (20,000 amperes), this circuit breaker 13 will assume the duty of opening the fault current. If the fault current be sufficient to cause the short time or instantaneous element (not shown) of breaker 4 to open, then this circuit breaker will open and isolate the defective fault. Since this last breaker has an interrupting rating equal to or greater than the maximum fault current available, the system will be adequately protected.

In this manner, for current in excess of their maximum interrupting ratings, each breaker will have the opportunity to remain latched in the closed position while the duty of actual interrupting of the fault current is thrust upon a circuit breaker more suitably designed to handle it.

Referring to Figure 3, I have illustrated a specific arrangement of time delays for achieving the above results. A magnet 40 energizable by fault currents in a manner well known in the art, is provided with a winding 150 connected usually in series with the power line which is being protected by the particular circuit breaker.

The magnet 40 is provided with the pivotally mounted armatures 41 and 42, normally biased by springs against their back stops. When either armature 41 or 42 moves to the magnet pole face on energization of the magnet 40, the lever 44 or 45 respectively, engages and operates the tripper bar 48 in the circuit breaker tripping mechanism 49 to trip the circuit breaker. The tripping mechanism 49 controls through the operating mechanism 50, the contact arm 51 carrying the movable contact 52 engaging a fixed contact 151 to maintain the power circuit closed. The specific construction and operation of this operating mechanism is described in detail in application S. N. 127,562 (owned by the present assignee) and filed November 16, 1949.

Armature 41 which is operable under control of the short time delay mechanism 73 in response to short circuit fault conditions is provided with a downwardly extending arm 70 which engages the end 71 of lever 72 of the short time delay mechanism 73.

Armature 42 which is operable under control of the long time delay mechanism in response to overload conditions is provided with a connecting pin 77 through which it is connected to the long time delay or dash pot mechanism 80. The detail construction and operation of this type of long and short time delay device is described in application, owned by the present assignee, S. N. 148,696 filed March 9, 1950. In general, however, timer 73 comprises gears with a verge providing an escapement which controls the rate of rotation of the gear mechanism. The magnetic pull of magnet 40, determined by the fault current flowing in winding 150, on armature 41, is transferred through arm 41 and extension 70 to the member 71 secured to and rotatable with the gearing at 72. The rate of movement of 70 and therefore armature 41 toward the pole face of magnet 40 is variably delayed by the time delay mechanism 72 in accordance with the extent of the fault current. For example, as shown in Figure 1 and described above, if the short time delay mechanism 72 is on the circuit breaker 18, a fault current of 7500 amperes will delay opening to .375 second.

In this case, the long time delay mechanism 80 will not function. It the fault is an overload, the long time delay mechanism 80 which consists of a dash pot as described in the above mentioned application, S. N. 148,696, delays through connecting link 77, the movement of armature 42 toward the pole face.

The time delay 72 is constructed as described in the above mentioned application to prevent any outstanding movement of armature 41 when the pull effected by magnet 40 corresponds to overload currents. In the latter case, only armature 42 is moved and under control of the long time delay mechanism 80.

As further described in the above mentioned application, time delay mechanism 72 is so constructed that armature 41 is delayed up to a point just before its extension 44 engages trip latch 48. At this point, armature 41 is released from control of the time delay mechanism 72 and the unrestrained force of the magnetic pull of magnet 40 is applied to armature 41 to permit extension 44 to strike trip latch 48 with unrestricted force.

The point 5 on curve 1" Figure 1 is selected so that the armature 41 of circuit breaker 18 has not been released from its time delay mechanism at this instant. When therefore, circuit breaker 17 opens the faulted line at the instant corresponding to point 5, and the magnet 40 of circuit breaker 18 is therefore deenergized, the armature 41 of circuit breaker 18 will return to its deenergized or back stop position without going through to engage and operate its associated tripper latch. In this manner, circuit breaker 18 will in the case of this particular fault current condition stay closed while the line 16 is opened by circuit breaker 17. This same condition for the relation of the short timer of circuit breaker 17 with relation to the timer of circuit breaker 16 is made at points 6 and 7.

As will now be apparent, the short time delay mechanism 73 of each of the circuit breakers is individually adjusted so that the short timer of circuit breaker 18 has the time-current characteristic of curve 1—1"; circuit breaker 17 has the time-current characteristic of curve 2—2"; circuit breaker 13 has the time-current characteristic of curve 3—3" and of circuit breaker 11 has the time-current characteristic of curve 4—4".

In this manner, if the fault is in the circuit of circuit breaker 18 and the fault current is of a value that circuit breaker 18 can extinguish, circuit breaker 18 will open and only this portion of the system will lose power. If the fault current is of a value which circuit breaker cannot extinguish, it will not attempt to do so. Instead it will stay closed while circuit breaker 17 will, if the fault current is of the value, circuit breaker 17 has the capacity to interrupt, open. In this case, of course, some of the system loses power. This same relative operation will apply to circuit breakers 13 and 11.

In the system described above, when a circuit breaker is to be closed, it may close on an existing fault condition. Usually when this occurs, the circuit breaker heretofore employed being provided with "trip free" mechanism, the trip mechanism will function the moment the circuit breaker is closed to instantly trip the circuit breaker even though closing forces are still being applied as illustrated in Patent 2,348,228. Where, however, as in the present system, a direct acting time delay mechanism is employed, when the contacts of the breaker are closed on a fault current, the time delay prevents instantaneous opening of the contacts. At the same time, the closing mechanism is functioning to tend to close the contacts.

The fault current flowing through the movable arm will set up electromagnetic forces called "blow open" forces tending to drive the contacts apart. These forces oppose the closing force. As a result, when the contacts are first closed, the magnetic forces acting against the closing forces drive the contacts apart to open the circuit. Thereupon since the closing force is still acting, the contacts reclose. This cycle of opening and closing or chattering of the contacts may continue until the contacts are destroyed.

The trip magnet controlled by the time delay mechanism does not have an opportunity during this short interval that the contacts stay closed to complete a tripping action and the contacts through such a pumping action are burned and destroyed.

It is accordingly an essential characteristic of any cascade system that provision be made to ensure contact engagement and latching against a fault current. To this end, I provide in my circuit breaker, an arrangement whereby while the contact 52 (Fig. 3) is being moved to engagement with contact 151, any electromagnetic forces set up due to a fault current when the contacts engage and before the contacts are latched in engagement will act to blow the contacts into closer engagement rather than open. This is called "blow closed" action. This "blow closed" action which occurs before the contacts are latched in engagement thus helps the closing operation to complete contact latch engagement even against a fault current.

The arrangement of the operating mechanism 50 and movable arm 51 is fully described in application S. N. 127,562, filed Nov. 16, 1949, owned by the assignee of this application. In general, the control mechanism 50 operated through links 91 and 92 to operate the arm 51 toward circuit closing position.

Just before contacts 52 and 151 engage, the member 93 is latched in position, thus locking links 91, 92 and pin 94. The final closing is effected through links 95, 96 and pin 97 which in moving to the left operates through pin 98 to move arm 51 counterclockwise about the fixed pin 94 until contacts 52 and 151 engage. Immediately after engagement of the contacts, limbs 95, 96 and pins 97, 98 are made fixed by latching at 99, all fully described in the above referred application 127,562.

Inasmuch as pin 94 is closer to contact 52 than to pin 98, during the period while contact engagement just occurs and before latching at 99 is completed, the magnetic forces below pin 94 on arm 51 will be greater than the magnetic forces above pin 94. As a result, the net magnetic effect is a "blow on" of contacts 52 and 151 until the latch at 99 is completed and the time delay mechanism functions to trip the movable arm.

Since pin 98 is fixed during tripping, pin 94 is movable, the latch at 93 being opened, the usual blow-open action is produced on arm 51.

While I have illustrated one form of my invention, it will be clear that it may take other forms within the spirit of my invention, and I intend to be limited only to the appended claims.

I claim:

1. In a selective trip system having a plurality of circuit breakers, each of different interrupting capacities, connected in series between a source and a load with the breaker closer to the load having the lower capacity, each of said circuit breakers having a fault current responsive device and a tripping mechanism actuated by its associated fault current responsive device for tripping its associated contact to disengagement, time delay means for each of said circuit breakers mechanically connected to its associated fault current responsive device for delaying the operation of its associated fault current responsive device, said time delay means comprising a short time delay mechanism and a long time delay mechanism; said tripping mechanism having a trip device associated with each of said long and short time delay mechanisms, the time-current characteristic of each of said circuit breakers provided by its associated time delay means providing shorter time of operation for the circuit breaker closer to the load than for the circuit breaker nearer to the source up to the interrupting capacity of the first mentioned circuit breaker and having a longer time than for the circuit breaker nearer the source at just below the interrupting rating of the first mentioned circuit breaker.

2. In a selective trip system having a plurality of circuit breakers connected in series, each of the circuit breakers having individual interrupting capacities, each of said circuit breakers also having fault current responsive devices energized by the fault current in the line being protected by its associated circuit breaker and a tripping mechanism directly actuated by its associated fault current responsive device for tripping its associated contact to contact disengaged position, a short and a long time delay mechanism mechanically connected to its fault current responsive device, the circuit breaker having the lower interrupting capacity having a shorter time of operation than the breaker having the larger interrupting capacity up to the interrupting capacity of said first mentioned breaker and having a longer time of operation than the breaker having the larger interrupting capacity for current values above its interrupting rating.

3. In a selective trip system having a plurality of circuit breakers connected in series, each of the circuit breakers having individual interrupting capacities each of said circuit breakers also having fault current responsive devices energized by the fault current in the line being protected by its associated circuit breaker and a tripping mechanism directly actuated by its associated fault current responsive device for tripping its associated contact to contact disengaged position, a short and a long time delay mechanism mechanically connected to its fault current responsive device, the circuit breaker having the lower interrupting capacity having a shorter time of operation than the breaker having the larger interrupting capacity up to a predetermined percentage of the interrupting capacity of said first mentioned breaker and having a longer time of operation than the breaker having the larger interrupting capacity for current values above a predetermined percentage of its interrupting rating.

4. In a selective trip system having a plurality of circuit breakers, each of different interrupting capacities, each of said circuit breakers having a fault current responsive device and a tripping mechanism actuated by its associated fault current responsive device for tripping its associated contact to disengagement, a long and a short time delay mechanism connected to its associated fault current responsive device for delaying the operation of its associated tripping mechanism, the long and the short time delay mechanism of the circuit breaker closest to the load having the shortest time of operation up to just below the interrupting capacity of said breaker and the next larger circuit breaker in the system having a shorter time of operation at just below and all values above the interrupting rating of the first mentioned circuit breaker.

5. In a selective trip system having a plurality of circuit breakers connected in series, each of the circuit breakers having individual interrupting capacities, each of said circuit breakers also having fault current responsive devices energized by the fault current in the line being protected by its associated circuit breaker and a tripping mechanism directly actuated by its associated fault current responsive device for tripping its associated contact to contact disengaged position a long and a short time delay mechanism mechanically connected to its fault current responsive device, the circuit breaker having the smallest interrupting capacity having a shorter time of operation than the breaker having the next larger interrupting capacity, up to or near the interrupting capacity of said first mentioned breaker and the circuit breaker of the next larger size having a shorter time of operation than the first mentioned circuit breaker for larger current values, said long time delay mechanism of said next larger size circuit breaker causing the opening of said larger size circuit breaker at an interrupting capacity below the interrupting rating of said first mentioned breaker for faults between said circuit breakers.

CORNELIUS J. RIDGLEY.

REFERENCES CITED

The following references are of record in the file of this patent:

UNITED STATES PATENTS

| Number | Name | Date |
| --- | --- | --- |
| 1,530,443 | Traver | Mar. 17, 1925 |
| 1,763,258 | Ross | June 10, 1930 |
| 2,372,134 | Steeb | Mar. 30, 1945 |
| 2,439,165 | Graves | Apr. 6, 1948 |
| 2,488,745 | Stratton | Nov. 22, 1949 |